Patented Aug. 11, 1953

2,648,654

UNITED STATES PATENT OFFICE 2,648,654

METHOD OF MAKING A RESINOUS SILOXANE AND PRODUCT

John E. Dereich, Painesville, Ohio, assignor to Diamond Alkali Company, Cleveland, Ohio, a corporation of Delaware No Drawing. Application December 23, 1949, Serial No. 134,847

9 Claims. (Cl. 260—46.5)

This invention relates to resinous siloxanes and to improvements in resinous siloxanes derived from hydrolyzates of organo-substituted silicon compounds having one organic radical bound to each silicon atom in the molecule. More particularly, the invention relates to reaction products of such organo-substituted silicon compounds with 1,2,3-trihalopropanes and a dechlorination agent, such as zinc. In addition, the invention relates to methods for effecting such improvements in such resinous siloxanes and to compositions containing the improved products.

It has heretofore been known that resinous siloxanes containing on the average one organic substituent attached to the silicon atoms therein (those siloxane materials which are the condensed hydrolyzates of organo-silicon compounds of the type $RSiX_3$, wherein X is halogen or other hydrolyzable group) are generally less readily decomposed by heat, moisture, and oxygen and are otherwise more stable and potentially more useful in the field of resinous materials than the siloxanes containing on the average more than one organic substituent attached to the silicon atoms thereof. However, the hydrolyzates of mono-organo substituted silicon halides, or other hydrolyzable mono-organo substituted compounds, as a class, rapidly undergo intermolecular condensation to highly cross-linked molecular structures resulting in brittle, resinous materials, which, because of their near-crystalline structure, have not enjoyed wide acceptance as resins suitable for molded articles.

It has now been found that derivatives of mono-organo substituted halosilanes may be reacted with 1,2,3-trichloropropane in such a manner that the condensed hydrolyzates of the reaction product no longer possess the characteristics of brittleness and crystallinity of the parent siloxane but are, instead, tough, flexible, tenacious resins suitable for use in a wide variety of resinous moldable compositions.

One of the objects of the present invention is to provide resinous siloxanes whose molecular structures are modifications of the highly cross-linked condensed hydrolyzates of mono-organo substituted silicon halides, such that the modified products are tough, flexible, tenacious resins.

Another object of the invention is to provide a method by which such modifications of the condensed hydrolyzates of organo-substituted silicon halides may be effected.

A further object of the invention is to provide moldable compositions of matter containing hydrolyzates of modified organo-substituted silicon halides, from which compositions molded articles of unusual toughness and flexibility may be obtained.

The present invention is more particularly directed to hydrolyzates and condensed hydrolyzates of the products of reaction of:

A. Organo-silicon compounds within the class $RSi(OR')_2X$, wherein R represents members of the group of mono-nuclear aryl, alkaryl, aralkyl hydrocarbon radicals, and lower aliphatic radicals, R' is a lower aliphatic radical, and X represents a member of the group of chlorine and bromine;

B. With 1,2,3-trihalopropanes of the class $XCH_2CHXCH_2X$, wherein X represents a member of the group chlorine and bromine; and, C. Metallic zinc.

The method of the invention includes the steps of combining a silicon compound of the aforesaid formula, a halo-substituted propane of the aforesaid formula, and metallic zinc, heating the mixture to effect a reaction, hydrolyzing the reaction product thus obtained, and optionally heating the hydrolyzate to effect intermolecular condensation. In addition, the invention is directed to moldable compositions of matter containing products obtained by the method.

Organo-silicon compounds within the class $RSi(OR')_2X$, referred to as dialkoxy derivatives of mono-organo substituted halosilanes, wherein the R substituent is selected from the group noted hereinabove, may be prepared from mono-organo silicon trihalides by the partial esterification of such halides with the appropriate amount of an alcohol, suitably a lower aliphatic alcohol, such as methyl, ethyl, propyl or butyl alcohol, preferably, however, methyl or ethyl alcohol. The dialkoxy derivatives of the mono-organo substituted halosilanes may be employed in the method and compositions of the present invention as:

1. A mixture of dialkoxy compounds prepared by reacting a mixture of mono-organo trichloro or tribromosilanes with the appropriate molecular amount of a suitable alcohol, and (A) Reacting the reaction mass thus obtained in toto with a trihalopropane, or (B) Heating the reaction mass first to remove dissolved hydrogen halides and then reacting with trihalopropane, or 2. Purified alkoxy derivatives prepared by partially esterifying appropriate organo-substituted silicon trihalide with a suitable alcohol and distilling the reaction mass to obtain a substantially pure alkoxy derivative. If desired, suitable amounts of the purified alkoxy derivatives thereafter may be combined prior to carrying out the reaction with the trihalopropane to obtain desired ratios of R substituents in the final product.

The alkoxy substituents of the mono-organo substituted halosilanes are present in the compound for directional purposes in order to insure that the reaction of the invention takes place predominantly between the remaining single halogen atom and the chlorine of the 1,2,3-trichloroalkane under the influence of zinc. While the theory of the present invention and the reaction thereof is not completely understood, and there is no intention to be bound by such theory, it is believed that cross-linking between individual molecules of the hydrolyzate is substantially modified by the presence of the residues of the trihaloalkanes in the condensed molecules.

In the above formula R includes any hydrocarbon radical of the groups mentioned, for example, aryl and alkaryl radicals, such as phenyl, and substituted phenyl radicals, such as tolyl, xylyl, ethylphenyl, and the like, and the higher substituted analogues of these compounds, aralkyl radicals, such as benzyl, methylbenzyl, ethylbenzyl, 2-phenylethyl, and their higher substituted homologues, analogues and isomers, and alkyl radicals, such as methyl, ethyl, propyl, butyl, and higher alkyl radicals. The choice of a substituent for the silicon atom in the preparation of the derivatives used in the manufacture of a given resinous material of the present invention is influenced to some extent by the uses to which the material is subsequently to be put and by the physical properties which those uses demand. Thus, for example, where strength and toughness, coupled with stability of the resinous material towards heat, light and moisture, are demanded, it is preferable to choose derivatives of the alkoxy halosilanes whose R substituents are within the group of phenyl or lower alkyl substituted phenyl radicals, and mixtures comprising derivatives containing such radicals with derivatives containing lower alkyl radicals. However, if the use to which the resinous material is to be put demands stability towards water moisture, higher alkylaryl and alkyl radicals, such as butyl, phenyl, hexyl, octyl and the like, may be employed, although generally it will be found preferable to employ members of the groups first noted above.

A particularly useful combination yielding resins having a high degree of resistance toward heat, light, and water are prepared in accordance with the present invention from the class of dialkoxy compounds wherein R represents a composite of phenyl and ethyl, or phenyl and methyl radicals. Such a composite of dialkoxy derivatives may be prepared from phenyl silicon trichloride or tribromide and ethyl silicon trichloride or tribromide, or methyl silicon trichloride or tribromide, by reaction of such halides or mixtures thereof with a suitable alcohol, for example, methyl alcohol, to form such compounds as phenyl dimethoxy chlorosilane and ethyl or methyl dimethoxy chlorosilane. Of this group of derivatives, a sub-group, the reaction products of which with 1,2,3-trihalopropanes and zinc have been found to yield hydrolyzates possessing exceptional stability towards heat, light, and water, are the compounds wherein the formula $RSi(OR')_2X$ represents a mixture of 70–90 mol percent of phenyl dialkoxy halosilane with 10–30 mol percent of methyl or ethyl dialkoxy halosilane. The resinous products which may be prepared from this sub-group in accordance with the method of the present invention possess an unusually high degree of heat resistance, while at the same time possessing flexibility and toughness to a degree completely unknown to the corresponding hydrolyzates of phenyl silicon trihalosilanes in the same proportionate admixture with ethyl or methyl trihalosilanes.

Metallic zinc, as employed in the method of the present invention, is preferably in a finely divided form, such as zinc dust, and may also be combined with copper in the form of copper powder, or may be used in the method herein in the form of a finely divided zinc-copper alloy, which alloy is referred to in the art as a "zinc-copper couple." The metallic zinc in the form of zinc dust, or combined with the copper powder, or in the form of a finely divided zinc-copper alloy, may be added to the mixture of an organo-substituted dialkoxy halosilane, or a combination of organo-substituted dialkoxy halosilanes with 1,2,3-trihalopropane, in a stepwise manner until the reaction is apparently substantially complete, or the zinc may be added all at the same time. However, where this latter technique is employed, careful control of the temperature of the reaction mass should be exercised after the addition of the metallic zinc during the course of the reaction in order to prevent side reactions which deleteriously affect the ultimate resinous products to be obtained.

The reaction is preferably carried out in a liquid reaction medium, for example, in a body of the mono-organo substituted dialkoxy halosilane itself, or in a solution of the dialkoxy halosilane in a liquid hydrocarbon, such as a $C_6$—$C_{13}$ saturated aliphatic hydrocarbon, or in an aromatic hydrocarbon, such as benzene, toluene, or xylene. Also, it has been found advantageous to employ an ether, such as diethyl ether, diisopropyl ether, or the like, in conjunction with the components of the liquid reaction medium in order to accelerate the reaction.

The molar ratio of 1,2,3-trihalopropane to the mono-organo substituted dialkoxy halosilane may be as high as 1:6 but is generally preferably of the order of 1:2 to 1:3. The molar ratio of metallic zinc to the 1,2,3-trihalopropane is in most instances suitably within the range of 1:0.12–1:1.25, preferably, however, within the range of 1:05–1:1.15, although other proportions, both higher and lower than these ranges, have also been found suitable in the preparation of the products of the method of the present invention. Combining the ratios of the preferred ranges, and stating the proportions in terms of 1,2,3-trihalopropane, the amounts of organo-dialkoxy halosilane, trihalopropane, and zinc are preferably within the molar proportions of 2–3:1:1–2.

The reaction may be initiated at temperatures substantially within the range of 40°–120° C. However, it has been found preferable to initiate the reaction and to maintain the temperature during the course of the reaction within the range of 45°–90° C. For the purpose of controlling the reaction temperature within the above preferred range, hydrocarbons boiling within this temperature range are preferably employed as diluents of the reaction mixture.

After the reaction between the organo-dialkoxy halosilane, the trihalopropane, and metallic zinc has proceeded to its apparent maximum degree, as evidenced by adding small amounts of powdered metallic zinc to the reaction mass without appearance of gas particles thereon, the reaction mass may be hydrolyzed by mixing it with water, or a combination of ice and water, with or without the addition thereto of small amounts of a mineral acid, such as sulfuric or hydrochloric acid.

Where water is used without the added mineral acid, hydrolysis of the alkoxy groups remaining in the reaction product is slow, and generally incomplete, as a result of which a very stable liquid material is formed, which liquid does not tend to undergo intermolecular condensation even upon extended periods of heating at high temperatures, for example, at temperatures of the order of 170° C. for periods up to 24 hours. In this form the partially hydrolyzed reaction products may be stored until such time as it is desired to prepare molding resins, or resinous molding compositions, at which time the partially hydrolyzed reaction products may be subjected to substantially complete hydrolysis of the alkoxy groups by subjecting the liquid material to the action of dilute mineral acid. Thereafter, the hydrolyzate thus obtained may be washed with water, and with dilute aqueous solutions of alkaline salts, such as sodium carbonate, and sodium bicarbonate, and dried to yield a condensable resinous hydrolyzate.

In either the acid or non-acid type hydrolysis, the hydrolyzate or solution thereof may be readily separated from the aqueous portion of the hydrolysis reaction mass by simple gravity separation, or by centrifuging, and, as noted in the case where an acid hydrolysis reaction medium is employed, the hydrolyzate or the solution thereof may be dried and comminuted prior to its preparation for use in resinous molding compositions.

The partially condensed, but substantially completely hydrolyzed comminuted reaction product thus obtained may be molded into any suitable shape by means of heat and pressure, and subsequently subjected to further heating to advance the intermolecular condensation of the resinous hydrolyzate material. If desired, small amounts of a suitable condensation catalyst in an amount of the order of 1% of the weight of the partially condensed hydrolyzate, such as an alklyolamine, for example, triethanolamine, may be employed to speed the condensation.

The hydrolyzates may suitably be combined with organic synthetic elastomers, an example of which is butadieneacrylonitrile copolymer.

Moreover, the hydrolyzates may be combined with suitable inorganic fillers, such as glass or asbestos, either in the form of fibers, such as chopped glass fibers or asbestos fibers, or in the form of webs, such as asbestos paper or cloth or glass cloth, finely divided lead oxide, lead sulfate, or mixtures thereof, basic lead sulfate, magnesium oxide, carbon black, silica, clay, calcium carbonate, calcium silicate, magnesium silicate, or the like. Admixture of the hydrolyzate with an inorganic filler material may be effected by combining such material with a solution of the resinous hydrolyzate, for example, a solution of the hydrolyzate in an aromatic hydrocarbon, such as benzene, toluene or xylene, or in an ether solution thereof, such as a solution of a hydrolyzate in either ethyl ether or isopropyl ether, and subsequently evaporating the solvent from the mixture of ingredients. Also, the filler material may be combined with the resinous hydrolyzate by combining both of these substances in a finely divided form in a suitable mechanical mixing device, such as a "Day" mixer, which utilizes contra-rotating eccentric masticating members to effect thorough mixing of the ingredients.

In general, in the above-described techniques for the preparation of molded articles from the hydrolyzates of the products of the present invention, the condensation catalyst for the hydrolyzate material is preferably combined therewith while the hydrolyzate is in liquid form, for example, while the hydrolyzate is in solution in any of the suitable solvents noted hereinabove, prior to mixing such solution with inorganic filler materials, and prior to the molding operation at elevated temperatures and pressures.

The compositions of the present invention are useful in any environment where resinous materials, which combine high heat resistance, of the order of 500° F. and higher, extreme toughness and tenacity, and oil and water resistance, are required. Many environments where this combination of properties are needed will suggest themselves to those skilled in the art. A few may be mentioned, it being understood that no attempt is made to provide an exhaustive list. Thus, they are indicated for coating and impregnating agents especially in heavy duty electrical applications, as binders in all sorts of resin-bound matrices especially for heavy duty service, as binders for laminates and in shaped articles, and the like.

In order that those skilled in the art may familiarize themselves with the method of the present invention, the products which are obtainable therefrom, and compositions in which such products may be employed, the following specific examples are offered:

*Example 1*

Eight-tenths of a mol of phenyl dimethoxy chlorosilane and 0.2 mol of ethyl dimethoxy chlorosilane are refluxed with 65 grams of zinc dust for a period of 2 hours. Thereafter, the insoluble residue of zinc and zinc chloride is separated from the remainder of the reaction mass by filtration, and the filtrate diluted with an equal volume of ethyl ether. The reaction product in ether solution is subjected to hydrolysis in aqueous HCl (10%), and the ether solution of the hydrolyzate separated from the remainder of the hydrolysis reaction mass by gravity separation and subjected to heat treatment at a temperature of the order of 110° C. for a period of time sufficient to evaporate the solvent ether. At the end of this time, the residue of the hydrolyzate has condensed to a hard, brittle resin, characteristic of hydrolyzates of mixtures of phenyl trichlorosilane and ethyl trichlorosilane hydrolyzed without the previous treatment with metallic zinc. This is indicative of the fact that whatever reaction may take place between the metallic zinc and the organo-substituted dimethoxy chlorosilane, the molecular structure of the hydrolyzate obtained from this product is substantially the same as that obtained from the hydrolysis of a mixture of phenyl trichlorosilane and ethyl trichlorosilane.

*Example 2*

Sixty parts of phenyl dimethoxy chlorosilane and 12.3 parts of ethyl dimethoxy chlorosilane are combined with 27.8 parts of 1,2,3-trichloropropane in a round-bottom reaction flask fitted with a mechanical stirrer, reflux condenser, and a stoppered funnel for the addition to the reaction flask of powdered metallic zinc. A mixture containing 5 parts of powdered metallic zinc and ½ part of powdered metallic copper is added to the reaction flask and the mechanical stirrer set in motion. Substantially immediately the reaction mass becomes warm and further additions of zinc dust, together with traces of powdered metallic copper, are added thereto until no further visible change on the surface of the particles of the zinc dust occur. At the end of this time, the reaction mass is diluted with an equal volume of benzene and the mixture thus obtained subjected to reflux temperatures for a period of one hour. The reaction mass is now filtered to remove the unreacted zinc, copper and zinc salts formed during the reaction, and the filtrate therefrom subjected to hydrolysis by refluxing the mixture with 200 mls. of water for a period of 30 minutes. Thereafter, the hydrolysis reaction mass is cooled and the aqueous layer separated from the benzene solution of the hydrolyzate and a portion of the hydrolyzate solution placed in a flat-bottom aluminum dish, which in turn is placed upon a water bath for the removal of the benzene therefrom. After substantially all of the benzene is evaporated from the hydrolyzate residue, the aluminum dish is placed in an oven at 170° C. for a period of 16 hours. At the end of this time, the resinous residue is found to be clear, flexible and very tough. Moreover, this material is not attacked by water when exposed thereto at a temperature of the order of 100° C. over extended periods of time. A further portion of the resinous residue is placed in an oven at 500° F. for a period of 4 hours, after which time the resin remains flexible and may be flexed through an angle of 100° without breaking or cracking.

*Example 3*

Seventy-seven parts of phenyl dimethoxy chlorosilane and 12 parts of methyl dimethoxy chlorosilane are mixed with 25 parts of 1,2,3-trichloropropane in the same apparatus as that described in Example 2 above. Thereafter, 50 parts of zinc dust, combined with 5 parts of powdered metallic copper, are added to the ingredients in the reaction flask in portions of 5 parts each over a period of approximately 1½ hours. Upon the initial addition of the combination of zinc dust and powdered copper to the ingredients in the reaction flask, the mixture becomes slightly warm and gas bubbles form upon the surface of the particles of the zinc. When no further change at the surface of the zinc particles is visible, 132 parts of benzene are added to the reaction mass and the zinc, copper, and zinc salts separated from the solution of reaction products by filtration. The filtrate is combined with an equal volume of water and subjected to reflux for a period of 15 minutes. Thereafter, the water and the benzene solution of the hydrolyzate are separated by gravity and the benzene solution dried over anhydrous sodium sulfate. A portion of the dried hydrolyzate solution is placed in a flat-bottom aluminum dish, which in turn is placed upon a water bath in order to remove the solvent therefrom, after which the resinous residue is heated at 170° C. for a period of 1½ hours. At the end of this time, the hydrolyzate is condensed to a resinous solid. Another portion of the benzene solution of the hydrolyzate material is combined with about 1% of triethanolamine, based on the weight of the hydrolyzate dissolved in the benzene solution, and subjected to this same treatment. After removing the aluminum dish from the water bath, it is observed that the resinous residue has hardened without further heating to a tough, flexible, resinous material, a portion of which, about 1 mm. in thickness, may be flexed through an angle of more than 60 without breaking or cracking.

*Example 4*

One hundred fifty-four parts of phenyl dimethoxy chlorosilane and 32 parts of ethyl dimethoxy chlorosilane are combined with 25 parts of 1,2,3-trichloropropane in an apparatus similar to that described in Example 2 above. A mixture of 90 parts of zinc dust and 10 parts of powdered metallic copper are added to the contents of the reaction flask in $\frac{1}{10}$ increments. Upon the addition to the reaction flask of the first portion of the mixture of metallic zinc and copper, the contents of the flask become warm and small bubbles of gas appear at the surface of the zinc particles. The mixture is heated at reflux temperature for a total period of 30 minutes. After 20 minutes, it is observed that white fumes form in the lower portion of the reflux condenser. At the end of the reflux period, the reaction mass is diluted with half its volume of diethyl ether, and the diluted mass filtered. The filtrate is subjected to hydrolysis with cold water containing a small amount of hydrochloric acid and the hydrolysis reaction mass stirred, whereupon an emulsion forms. The hydrolysis reaction mass is cooled substantially to freezing temperature in order to break the emulsion and a clear ether solution of the hydrolyzate is thus obtained. After separating the ether solution of the hydrolyzate from the aqueous portion thereof, the ether solution is dried over anhydrous sodium sulfate. A small portion of the dried hydrolyzate solution is placed in a flat-bottom aluminum dish and subjected to heating at a temperature of 165° C. for a period of 60 hours, after which time the resinous residue remains flexible. Another portion of the ether solution of the hydrolyzate material is combined with 1% of triethanolamine, based on the weight of the hydrolyzate in solution, and the solvent ether evaporated therefrom. The remaining solid is pulverized to a powder and molded into a disk approximately $\frac{3}{16}$ inch in thickness and 2 inches in diameter. The disk is cut in two and one portion thereof subjected to heating at 165° C. for a period of 60 hours, after which time none of its flexibility or toughness is lost, and a second portion heated to a temperature of 500° F. for a period of 18 hours, at the end of which time it is uniformly darker throughout but retains substantially all of its initial strength and increases somewhat in hardness. Thus, the advantageous properties of the resins are substantially equally preserved after prolonged heating at widely varying temperatures.

*Example 5*

Three mols of ethyl dimethoxy chlorosilane are combined with 1 mol of 1,2,3-trichloropropane in an apparatus similar to that described in Example 2 above and the mixture diluted with one-half of its volume of ether. Small amounts of powdered zinc and powdered copper in the weight ratio of 9:1 are added to the mixture in the reaction flask from time to time, while the mixture is heated at the reflux temperature. When no further change in the appearance of the surface of zinc particles is evident, the reaction mass is cooled and filtered. The filtrate is subjected to hydrolysis with dilute hydrochloric acid solution, and after separation of the aqueous layer, the ether solution is washed with dilute sodium carbonate solution. Evaporation of the solvent from this latter solution gives a clear flexible resin similar to that described in Examples 2, 3, and 4 above.

*Example 6*

A mixture of 0.8 mol of phenyl silicon trichloride and 0.2 mol of ethyl silicon trichloride is placed in a round-bottom reaction flask fitted with a reflux condenser, a mechanical stirrer, and a separatory funnel. Two mols of methyl alcohol are placed in the separatory funnel and added to the mixture of phenyl silicon trichloride and ethyl silicon trichloride, while subjecting the mixture to mechanical agitation. After all of the methyl alcohol has been added to the mixture of organo-silicon trichlorides, the reaction mass is heated to reflux temperature and maintained at this temperature for a period of 10 minutes, after which the reaction mass is cooled. One-third mol of 1,2,3-trichloropropane is added to the reaction mass and the whole agitated until a uniform mixture is obtained, whereupon 50 mls. of ether are added to the reaction flask. A small amount of a mixture of 19 parts of zinc dust and 2 parts of powdered metallic copper is added to the contents of the reaction flask, being vigorously agitated; immediately the contents of the reaction flask become warm and a vigorous reaction ensues. Thereafter, the zinc-copper mixture is added in increments of 5 parts until no further apparent reaction takes place (total 15-20 parts). The reaction mass is subjected to filtration and the filtrate hydrolyzed in water containing a small amount of hydrochloric acid. The aqueous and non-aqueous layers of the hydrolysis reaction mass are separated and a portion of the non-aqueous layer combined with 1% of triethanolamine, based on the weight of non-volatile residue contained in the solution, and the solvent evaporated therefrom. The resinous residue remaining after the evaporation of the solvent ether is comminuted to a fine powder, which is molded into a disk approximately $\frac{3}{16}$ inch thick and 2 inches in diameter. The disk is heated at 170° C. for a period of 12 hours, after which time it possesses unusual strength and resistance to mechanical shock. A portion of the disk immersed in water for a period of 18 hours at reflux temperature showed no visible signs of decomposition. Another disk of the same size as that noted previously is prepared from another portion of the molding powder, heated for 15 hours at 170° C., and thereafter subjected to a temperature of 260° C. for a period of 18 hours. This disk is cut into two portions, one of which is immersed in water at the reflux temperature for a period of 18 hours without any visible change at the surface thereof. The other portion of this disk discolored somewhat upon heating at 260° C. but showed no signs of physical failure, such as cracks within the body thereof, and lost only 9% of its weight during the heating period.

*Example 7*

A mixture of 167 parts of phenyl silicon trichloride and 32 parts of ethyl silicon trichloride is placed in an apparatus similar to that described in Example 2 above and 63 parts of methyl alcohol added to this mixture from the dropping funnel, while the mixture of organo-silicon trichlorides is agitated. Ninety-three parts of 1,2,3-tribromopropane are added directly to the reaction mass obtained from the reaction of the organo-silicon trichlorides with the methyl alcohol, as described above, without further heating to drive off dissolved hydrogen chloride. Sixty-five parts of zinc dust are added to the contents of the reaction flask in increments of 5 parts each, an immediate reaction apparently taking place upon the addition of the initial portions thereof, after which, and during the addition of the subsequent portions of the zinc dust, the reaction mass is heated to reflux temperature. The total elapsed time for the addition of the zinc dust to the reaction mass in the reaction flask is 1½ hours, after which the contents of the flask are cooled substantially to room temperature and diluted with an equal volume of toluene and filtered. The toluene solution of the reaction mass is subjected to hydrolysis by contact with an equal volume of water, to which a few drops of concentrated hydrochloric acid have been added. The toluene solution of the hydrolyzate from this hydrolysis reaction is separated from the aqueous portion of the reaction mass and a portion of the solution heated on a hot water bath to drive off the solvent. The residue obtained after the removal of the solvent is a thick liquid, which remains liquid after heating for 24 hours at 170° C., and it is found that condensation catalysts, such as triethanolamine, when added thereto, have no apparent effect. The remaining portion of the toluene solution of the hydrolyzate is then mixed with concentrated sulfuric acid, washed with water and with a dilute aqueous solution of sodium carbonate in order to remove the last traces of the sulfuric acid. Thereafter, the resulting solution is dried over anhydrous sodium sulfate. A portion of this latter hydrolyzate solution is placed in a flat-bottom aluminum dish, which in turn is placed upon a hot water bath in order to remove the toluene, and the residue obtained therefrom is heated at 260° C. for a period of 5 hours. The residue remaining in the dish formed a film approximately 1 ml. in thickness, which film, following the heating period at 260° C. for 5 hours, could be flexed through an angle of substantially 180° without breaking.

While there have been described various embodiments of the invention, the methods and products described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The resinous products obtained by condensing a hydrolyzate of the products of reaction of a compound selected from the group consisting of compounds having the general formula $$RSi(OR')_2X$$

wherein R represents a member of the group consisting of mono-nuclear aryl, alkaryl and aralkyl hydrocarbon radicals, and lower aliphatic hydrocarbon radicals, R' is a lower alkyl radical, and X represents a member of the group consisting of chlorine and bromine, and mixtures of such compounds, with a compound having the general formula $XCH_2CHXCH_2X$, wherein X represents a member of the group consisting of chlorine and bromine, and with metallic zinc.

2. The resinous product obtained by condensing a hydrolyzate of the products of reaction of a plurality of compounds having the general formula $RSi(OR')_2X$, wherein R is chosen from the group consisting of mono-nuclear aryl and alkaryl hydrocarbon radicals, and lower aliphatic hydrocarbon radicals, R' is a lower alkyl radical, and X is chosen from the group consisting of chlorine and bromine, with a compound having the general formula $XCH_2CHXCH_2X$, wherein X is chosen from the group consisting of chlorine and bromine, and with metallic zinc.

3. The resinous product obtained by condensing a hydrolyzate of the products of reaction of a plurality of compounds having the general formula $RSi(OR')_2X$, wherein R in part of the plurality of compounds is a phenyl radical and in part a radical having the formula $C_xH_y$, where $x$ is a whole number smaller than 3 and $y$ is $2x$ plus 1, R' is a lower alkyl radical, and X represents a member of the group consisting of chlorine and bromine, with a compound having the general formula $XCH_2CHXCH_2X$, wherein X represents a member of the group consisting of chlorine and bromine, and with metallic zinc.

4. The resinous product obtained by condensing a hydrolyzate of the products of reaction of a plurality of compounds having the general formula $RSi(OR')_2X$, wherein R in part of the plurality of compounds is a benzyl radical and in part a radical having the formula $C_xH_y$, where $x$ is a whole number smaller than 3 and $y$ is $2x$ plus 1, R' is a lower alkyl radical, and X represents a member of the group consisting of chlorine and bromine, with a compound having the general formula $XCH_2CHXCH_2X$, wherein X represents a member of the group consisting of chlorine and bromine, and with metallic zinc.

5. The method of making a resinous siloxane which includes the steps of reacting a compound selected from the group consisting of compounds having the general formula $RSi(OR')_2X$, wherein R is a member of the group consisting of mono-nuclear aryl, alkaryl and aralkyl hydrocarbon radicals, and lower aliphatic hydrocarbon radicals, R' is a lower alkyl radical, and X represents a member of the group consisting of chlorine and bromine, and mixtures of such compounds, with a compound having the general formula $XCH_2CHXCH_2X$, wherein X represents a member of the group consisting of chlorine and bromine, and with metallic zinc, hydrolyzing the reaction products thus obtained, and heating the hydrolyzate to effect molecular condensation.

6. The method of claim 5 in which the reaction of $RSi(OR')_2X$, $XCH_2CHXCH_2X$, and zinc is carried out in a liquid hydrocarbon medium.

7. The method of claim 5 in which the reaction of $RSi(OR')_2X$, $XCH_2CHXCH_2X$, and zinc is carried out in an inert liquid medium comprising a hydrocarbon and a dialkyl ether.

8. The method of claim 5 in which R in part of the plurality of compounds is a phenyl radical and in part a radical having the formula $C_xH_y$, where $x$ is a whole number smaller than 3 and $y$ is $2x$ plus 1.

9. A composition of matter comprising a hydrolyzate of the products of reaction of a compound selected from the group consisting of compounds having the general formula $RSi(OR')_2X$, wherein R represents a member of the group consisting of mono-nuclear aryl, alkaryl and aralkyl hydrocarbon radicals, and lower aliphatic hydrocarbon radicals, R' is a lower alkyl radical, and X represents a member of the group consisting of chlorine and bromine, and mixtures of such compounds, with a compound having the general formula $XCH_2CHXCH_2X$, wherein X represents a member of the group consisting of chlorine and bromine, and with metallic zinc.

JOHN E. DEREICH.

No references cited.